United States Patent
Shahaf et al.

(10) Patent No.: US 7,212,841 B2
(45) Date of Patent: May 1, 2007

(54) TELEPHONE APPARATUS AND A COMMUNICATION METHOD USING SUCH APPARATUS

(75) Inventors: Mark Shahaf, Ashdod (IL); Boaz Or-Shraga, Ramat-Gan (IL); Izak Avayu, Mevaseret Zion (IL)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/477,278

(22) PCT Filed: May 13, 2002

(86) PCT No.: PCT/EP02/05372

§ 371 (c)(1),
(2), (4) Date: Nov. 12, 2003

(87) PCT Pub. No.: WO02/096075

PCT Pub. Date: Nov. 28, 2002

(65) Prior Publication Data

US 2004/0131178 A1 Jul. 8, 2004

(30) Foreign Application Priority Data

May 14, 2001 (GB) .............................................. 0111776

(51) Int. Cl.
*H04M 1/00* (2006.01)

(52) U.S. Cl. .................. 455/570; 455/63.1; 455/67.13; 379/406.01

(58) Field of Classification Search ................. 455/570, 455/569.1, 63.1, 67.13, 501, 114.2, 222; 379/406.01, 388.02, 420.01, 420.02, 420.03, 379/433.02, 406.05
See application file for complete search history.

(56) References Cited

U.S. PATENT DOCUMENTS

| | | | | |
|---|---|---|---|---|
| 5,477,535 A | * | 12/1995 | Lahdemaki | .................. 370/291 |
| 5,638,439 A | | 6/1997 | Kawada et al. | |
| 5,661,795 A | | 8/1997 | Maeda | |
| 5,771,440 A | | 6/1998 | Sukhu et al. | |
| 5,889,857 A | | 3/1999 | Boudy et al. | |
| 6,148,078 A | | 11/2000 | Romesburg | |
| 6,185,300 B1 | * | 2/2001 | Romesburg | ............ 379/406.09 |
| 6,507,653 B1 | * | 1/2003 | Romesburg | ............ 379/406.05 |
| 6,597,787 B1 | * | 7/2003 | Lindgren et al. | ...... 379/406.05 |
| 6,614,907 B1 | * | 9/2003 | Laberteaux et al. | ... 379/406.03 |
| 6,697,486 B1 | * | 2/2004 | Takada | .................. 379/406.01 |
| 6,799,062 B1 | * | 9/2004 | Piket et al. | .............. 455/569.1 |

OTHER PUBLICATIONS

Jacob Benesty, Pierre Duhamel and Yves Greneir, Multi-Channel Adaptive Filtering Applied to Multi-Channel Acoustic Echo Cancellation, Lucent Technologies, Bell Labs Innovations, New Jersey, USA, pps 1405–1408.

* cited by examiner

*Primary Examiner*—Sonny Trinh
(74) *Attorney, Agent, or Firm*—Valerie M. Davis

(57) ABSTRACT

In accordance with a first aspect of the present invention there is provided a telephone apparatus including a transmitter portion and a receiver portion, an input transducer for converting input audio signals into electrical signals, a connectable input link between the input transducer and the transmitter portion to deliver when connected an input electrical signal to the transmitter portion to be transmitted by the transmitter portion, an output transducer for converting an output electrical signal into an audio signal and a connectable output link between the receiver portion and the output transducer for delivering when connected an output signal to the output transducer, optionally an echo cancellation circuitry portion adapted to sample the output signal and produce an echo replica signal, optionally a mixer included in the input link for mixing an echo replica signal produced by the echo cancellation circuit with an input signal produced by the input transducer, and an echo suppression circuitry portion including detector means for producing a first magnitude signal which represents a magnitude property of a first sample of an output signal $S_o$ in the output link and a second magnitude signal which represents a magnitude property of a second sample of an input electrical signal $S_i$ in the input link between the mixer and the transmitter portion, an analyzer, connected to receive inputs comprising the first and second magnitude signals from the detector means, for measuring a relationship between the first and second magnitude signals and for producing a control signal when the relationship exceeds a threshold, wherein the detector means is operable periodically to analyse characteristics of the signal $S_o$ to estimate the amount of background noise in the signal $S_o$ and to pass as an input to the analyzer a signal representing the estimated amount of backgroudn noise wherein the threshold above which the analyzer produces an output control signal is set adaptively by the analyzer dependent on the estimated background noise.

16 Claims, 1 Drawing Sheet

TELEPHONE APPARATUS AND A COMMUNICATION METHOD USING SUCH APPARATUS

This application claims the benefit of prior filed co-pending international application Serial No. PCT/EP02/005372 filed May 13, 2002, and assigned to Motorola, Inc., which was published by the International Bureau on Nov. 28, 2002 under No. WO 02/096075 A1; and Great Britain application Serial No. 0111776.1 filed May 14. 2001.

FIELD OF THE INVENTION

This invention relates to telephone apparatus and a communication method using such apparatus. In particular, it relates to telephone apparatus for use as a mobile unit in noisy environments.

BACKGROUND OF THE INVENTION

Telephone units which can operate in a speakerphone mode are popular and widely available both for landline and radio communication. Such units ('speakerphone units') include a microphone and a speaker (loudspeaker) arranged to receive and transmit speech information in a hands-free operation. Speakerphone units may be used as mobile telephone units in vehicles. Speakerphone units typically suffer from certain drawbacks, which often make their use difficult or inconvenient. In particular, speakerphone units may be highly susceptible to interference from local noise. In particular, decreasing size and cost of manufacture of the units leads to decreasing acoustic isolation between the output audio device such as a speaker or earpiece and the microphone of the units. The output of the speaker/earpiece is simultaneously recorded by the microphone and then undesirably re-transmitted, hence creating a direct-path echo which interferes with speech of the spoken words.

In addition, when an external speaker and microphone are in use in a mobile environment in a vehicle, reverberations of the output acoustic signal inside the vehicle constitute indirect echos. To overcome the problem of such external echos, it is known in the prior art to synthesise a replica of the echos by modelling the echo path and then subtracting the result from the transmitted signal. An algorithm commonly used for this so called 'echo-cancellation' comprises a LMS (least mean square) based procedure, for low cost implementation. Unfortunately, the cancellation of the residual echo by such procedures is not absolute.

When establishing a call between two telephone units, namely unit A and unit B, e.g. mobile radio units in vehicles, an echo coupling will occur in unit A when unit B receives a speech signal, or is picking up background noise (for instance unit B is in a noisy car). In this situation, an audio signal will be produced at the speaker of unit A and part of it will be returned to the microphone of unit A as a residual echo. If unit A does not receive any significant locally generated audio signal at its microphone, this type of echo is known as 'far-end only'. In the situation where the user of unit A produces speech which is picked up by the microphone of unit A and there is no signal at the speaker of unit A (no echo exists) this is known as 'near-end only'. Whenever in unit A there is a signal from unit B and the user of unit A is talking at the same time there will be at the microphone of unit A a mixed signal of echo and 'near-end'. This is known as 'double-talk'.

In use of LMS based echo-cancellation algorithms an echo-suppressor algorithm is sometimes also employed because the amount of attenuation achieved by echo-cancellation is insufficient. This is true in various communication conditions but the returned echo is particularly perceived in 'far-end only' echo conditions as described above. Therefore, the echo-suppressor is usually arranged to operate a switching device to provide disconnection of the microphone if a certain level of residual echo noise is present after operation of the echo cancellation algorithm. The level is selected by assuming the lowest attenuation of the returned echo signal during typical operation and it is normally based on echos which comprise speech signals which are difficult for proper processing due to their non-stationary characteristics. The echo suppressor decisions which determine whether the switching device is to be operated are usually made by determining a ratio or difference between the measured input energy from the microphone and the measured output energy being sent to the speaker, and comparing this ratio or difference to a predetermined fixed threshold. Echo suppressors of this kind cannot distinguish between energy at the loudspeaker due to speech signals and noise.

Therefore, if radio A communicates with radio B placed in noisy environment (for example a noisy car, possibly using a vehicle adaptor for the radio) the background noise received from radio B might easily cause the echo suppression system in radio A to switch off the microphone because the received signal has a high noise content. Thus, the microphone signal of radio A will be frequently cut off and communication becomes very difficult or impossible. The microphone cutting off is known as microphone 'clipping.'

In order to overcome this frequent clipping problem the signal from the microphone may be replaced with a substitute signal or the microphone may be diconnected for a long period. Neither of these solutions is satisfactory.

An example of a prior art arrangement including an echo cancellation portion and an echo suppression portion is described in WO00/35603A the contents of which are incorporated herein by reference.

One purpose of the present ivention is to provide improved communication between units wherein one or both of the units is in a noisy environment, especially by having less frequent microphone clipping in communication between units in which microphone clipping by an echo suppression system is provided.

SUMMARY OF THE INVENTION

In accordance with a first aspect of the present invention there is provided a telephone apparatus including a transmitter portion and a receiver portion, an input transducer for converting input audio signals into electrical signals, a connectable input link between the input transducer and the transmitter portion to deliver when connected an input electrical signal to the transmitter portion to be transmitted by the transmitter portion, an output transducer for converting an output electrical signal into an audio signal and a connectable output link between the receiver portion and the output transducer for delivering when connected an output signal to the output transducer, optionally an echo cancellation circuitry portion adapted to sample the output signal and produce an echo replica signal, optionally a mixer included in the input link for mixing an echo replica signal produced by the echo cancellation circuit with an input signal produced by the input transducer, and an echo suppression circuitry portion including detector means for producing a first magnitude signal which represents a magnitude property of a first sample of an output signal $S_o$ in the output link and a second magnitude signal which represents a magnitude property of a second sample of an input electrical signal $S_i$ in the input link between the mixer and the transmitter portion, an analyser, connected to receive inputs comprising the first and second magnitude signals from the detector means, for measuring a relationship between the first and second magnitude signals and for producing a control signal when the relationship exceeds a threshold, wherein the detector means is operable periodically to analyse characteristics of the signal $S_o$ to estimate the amount of background noise in the signal $S_o$ and to pass as an input to the analyser a signal representing the estimated amount of background noise wherein the threshold above which the analyser produces an output control signal is set adaptively by the analyser dependent on the estimated background noise.

The control signal generated in operation by the analyser may be delivered to a control means which may reduce or switch off the signal $S_i$ and/or replace the signal $S_i$ with another signal, e.g. artificial noise created by a comfort noise generator. Where the control means is operable to switch off the signal $S_i$, the control means may comprise switching means operable to disconnect the input link. The switching means may optionally be arranged so that when the input transducer is disconnected the output transducer is at the same time connected to a device delivering the signal So.

The present invention beneficially provides improved communication between users having telephone units operating in an environment wherein the amount of noise generated can be considerable and may vary quickly with time, especially mobile radio units, e.g. wherein one or both is employed for use in a moving vehicle. In particular, the invention gives a convenient and inexpensive solution to the problem of background noise influence on echo-suppressor decisions discussed earlier (in the Background section) by producing an adaptive noise threshold which is a direct function of the signal and/or noise characteristics of the signal $S_o$ delivered to the output transducer. The invention employs the echo suppression circuit in conjunction with an echo cancelling circuit thereby to enhance the effect of such an echo cancelling circuit.

In the apparatus according to the invention the input transducer means may be a microphone. The microphone may be connectable by the switching means via the input link in a conventional manner to the transmitter portion and the output transducer, e.g. audio device, may be connectable in a conventional manner to the receiver portion via the output link. Thus, in operation the signal $S_i$ is passed from the input transducer to the transmitter portion when the two are connected and the signal $S_o$ is passed from the receiver portion to the output transducer when the two are connected. The transmitter and receiver portions may be combined at least in part in a single common transceiver unit. The transmitter and receiver portions (or transceiver) may be operable to transmit and receive signals communicated by any known telephone communication method, e.g. as electrical or optical signals via appropriate cables or landlines or by radio communication directly or via an intermediate station or by a combination of two or more of these methods. The present invention is particularly useful when applied to mobile radio communication units for operation in a changing noise environment, e.g. in a vehicle.

The output audio device in the apparatus according to the invention may comprise a speaker (loudspeaker) or an earpiece or other known audio output device.

In order to have a reliable microphone clipping threshold that is not misled by background noise or increased stationariness of the signal, the microphone clipping threshold may be adapted as a function of the received signal characteristics (e.g. noise level estimation). For example, since background noise is characterized by higher stationariness (lack of change) than a speech signal, the noise level received at the output audio device, e.g. speaker, may be estimated in a known manner, e.g. by using a detector to sample the received signal being delivered to the output audio device. Such a detector may detect whether the signal charctaristics are stationary (noise or noise like) or not (non-stationary noise—background speech for example). A specific example for of detector is a processor type known as VAD—voice activity detector. VAD comprises an algorithm that is applied in order to analyse statistically the received signal $S_o$ delivered to the output audio device for its stationariness and other characteristics such as periodicity and gain. According to the estimated noise level, the threshold will be updated to a suitably higher value and this will produce a control signal), e.g. to provide microphone clipping, at a higher energy level of the received signal $S_o$.

In order to avoid rapid transitions between states and threshold values due to instantaneous fluctuations in signal characteristics, a hysteresis may be introduced in updating of the noise threshold level. This may be of the form of $\alpha * N(k)$, where $0 \leq \alpha \leq 1$. A suitable value of the hysteresis factor $\alpha$ is between 0.6 and 0.9, especially about 0.75. The exact value can be selected for specific operational conditions.

In accordance with a second aspect of the present invention there is provided a method of communication between two radio units wherein both units are apparatus according to the first aspect.

Embodiments of the present invention will now be described by way of example with reference to the accompanying drawings, in which:

DESCRIPTION OF DETAILED EMBODIMENT (S) OF THE INVENTION

Figure 1:
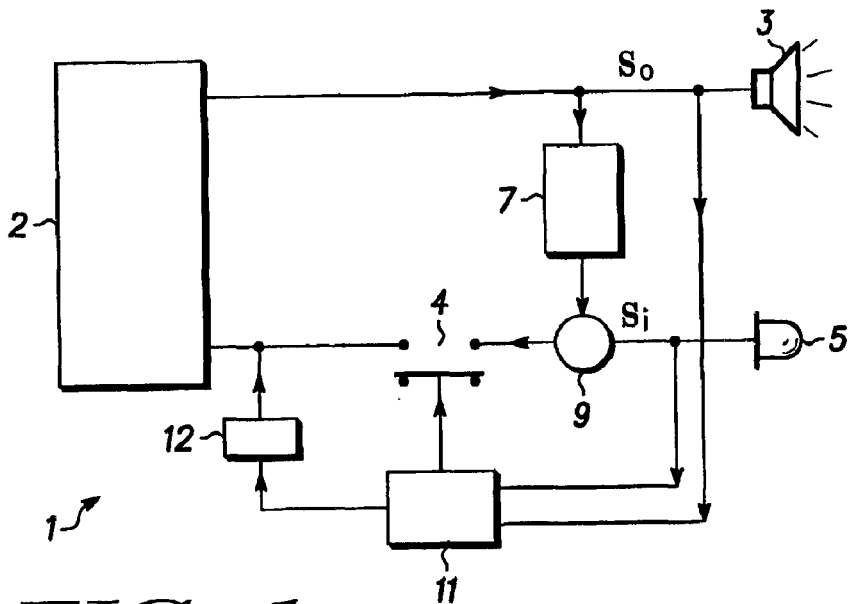
FIG. 1 is a schematic circuit diagram showing a mobile radio telephone unit embodying the invention.

Referring now to FIG. 1, a mobile radio telephone communications unit 1 comprises a transceiver 2 for transmitting and receiving radio communications. The transceiver 2 is connected to a speaker 3 and via an electrically operated switching device 4 to a microphone 5. A sample of a signal $S_o$ is passed from the transceiver 2 to an echo canceller unit 7 which synthesises a replica of echo by modelling an echo path in the known manner described in WO 01/35603. The unit 7 delivers an output to a mixer 9. A signal $S_i$ representing input speech is produced by the microphone 5 and is passed to the mixer 9. The output of the mixer 9 consists of a signal in which the simulated echo produced by the unit 7 has been subtracted from the signal $S_i$ and is passed to the transceiver 2 when the switching device 4 provides a suitable connection. The connection provided by the switching device 4 between the transceiver 2 and mixer 9 may be disabled by the action of a control signal produced as an output from a noise suppression unit 11 which receives as inputs samples of the signals $S_o$ and $S_i$.

Figure 2:
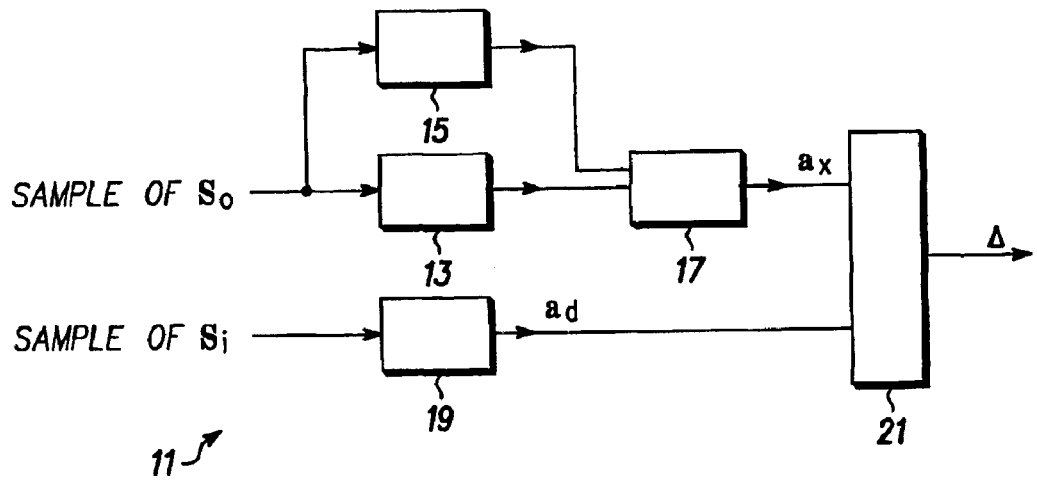
FIG. 2 is a schematic circuit diagram illustrating in more detail an echo suppression circuit of the unit shown in FIG. 1 and its operation.

FIG. 2 illustrates the noise suppression unit 11 in more detail. A signal which is a sample of the signal $S_i$ from the microphone 5 is fed to a signal estimation block 13 and to a characteristics detector 15 which detects the amount of pure signal or noise present in the signal. Outputs from the estimation block 13 and from the characteristics detector 15 are delivered to a noise estimation block 17. A signal which is a sample of the signal $S_o$ is fed to a signal estimation block 19.

Each of the the signal estimation blocks 13 and 19 calculates the energy or amplitude of its sampled signal s according to Equation 1 (for amplitude) or Equation 2 (for energy) as follows:

$$a_s = \sum_{i=0}^{N-1} |s(i)| \qquad \text{Equation 1}$$

$$a_s = \sum_{i=0}^{N-1} s(i)^2 \qquad \text{Equation 2}$$

where $a_s$ is the value calculated and N is the number of samples taken.

The characteristics detector 15 by recognising the component of pure signal representing speech present in the signal $S_i$ calculates the amplitude or energy sum of samples of that component and delivers the calculated value to the noise estimation block 17. The noise estimation block 17 thereby calculates the energy or amplitude of the noise component of the signal sampled by the subtracting the output of the characteristics detector 15 from the output of the signal estimation block 13. A logical comparator block 21 receives an input $a_x$ from the noise estimation block 17 and an input $a_d$ from the signal estimation block 19. The comparator block 21 provides a Boolean output $\Delta$ according the conditions expressed in (3) as follows:

$$\begin{cases} \Delta = \text{``}1\text{''}, \text{if } a_x - a_d > TH \\ \Delta = \text{``}0\text{''}, \text{otherwise} \end{cases} \qquad (3)$$

Here TH is designated as the microphone clipping threshold.

Where the output of the comparator block is '0' no action is taken. When the output is '1' the output may be employed to operate the switching device 4 (FIG. 1) to disconnect the transceiver 2 from the mixer 9 and microphone 5. In addition, the input to the transceiver 2 may optionally be replaced by the output of a comfort noise generator (FIG. 1). Alternatively, the '1' output from the comparator block 21 may be employed to reduce the gain of the input signal $S_i$ applied from the mixer to the transceiver.

The microphone clipping threshold (TH) is adaptive and may be updated according to the output from the noise estimation block according to (4) as follows:

$$\begin{cases} TH = \beta \cdot TH_{Base}, \text{if } N(k) > TH_{Noise}, \beta > 1 \\ TH = TH_{Base}, \text{if } N(k) < \alpha \cdot TH_{Noise} \end{cases} \qquad (4)$$

where $TH_{Base}$ is the existing threshold and N(k) is the noise level and $\alpha$ and $\beta$ are multipliers.

What is claimed is:

1. A telephone apparatus comprising a transmitter portion and a receiver portion, an input transducer for converting input audio signals into electrical signals, a connectable input link between the input transducer and the transmitter portion to deliver when connected an input electrical signal to the transmitter portion to be transmitted by the transmitter portion, an output transducer for converting an output electrical signal into an audio signal and a connectable output link between the receiver portion and the output transducer for delivering when connected an output signal to the output transducer, and an echo suppression circuitry portion comprising detector means for producing a first magnitude signal which represents a magnitude property of a first sample of an output signal So in the output link and a second magnitude signal which represents a magnitude property of a second sample of an input electrical signal Si in the input link, an analyser, connected to receive inputs comprising the first and second magnitude signals from the detector means, for measuring a relationship between the first and second magnitude signals and for producing a control signal when the relationship exceeds a threshold, wherein the detector means is operable periodically to analyse characteristics of the signal So to estimate the amount of background noise in the signal So and to pass as an input to the analyser a signal representing the estimated amount of background noise wherein the threshold above which the analyser produces an output control signal is set adaptively by the analyser dependent on the estimated background noise.

2. Apparatus according to claim 1 wherein the control signal generated in operation by the analyser is delivered to a control means operable to reduce or switch off the signal $S_i$ or replace the signal $S_i$ with another signal.

3. Apparatus according to claim 2 further comprising a switch connected between the control means and the input link wherein the control means is operable to produce a signal which controls connection and disconnection of the input link.

4. Apparatus according to claim 1 further comprising an echo cancellation circuitry portion to sample the output signal and to produce an echo replica signal and a mixer included in the input link for mixing an echo replica signal produced by the echo cancellation circuitry portion with an input signal produced by the input transducer.

5. Apparatus according to claim 4 further comprising a switch connected between the control means and the input link wherein the control means is operable to produce a signal which controls connection and disconnection of the input link, wherein the switch is operable to connect or disconnect the input link between the mixer and the transmitter portion.

6. Apparatus according to claim 4 further comprising a switch connected between the control means and the output link and operable to connect the output link when the input link is disconnected.

7. Apparatus according to claim 1 wherein the analyser is operable to subtract the second magnitude signal from the first magnitude signal and to compare the result with the threshold.

8. Apparatus according to claim 1 wherein the first and second magnitude signals represent an amplitude measurement or an energy measurement of their respective sampled signals.

9. Apparatus according to claim 8 further comprising means for collecting a magnitude measurement for each of a plurality of sample blocks of the sampled signals and producing a magnitude measurement representative of each plurality of the blocks.

10. Apparatus according to claim 1 wherein the detector means comprises a voice activity detector to estimate the component of voice signal in the combined signal and noise of the sampled signal $S_o$.

11. Apparatus according to claim 1 wherein in operation there is a hysteresis between measurement of a particular noise level and updating of the threshold level.

12. Apparatus according to claim 1 wherein at least parts of the transmitter and receiver portions are provided by common components.

13. Apparatus according to claim 1 wherein the transmitter and receiver portions are operable to transmit and receive signals communicated as electrical or optical signals via appropriate cables or landlines or by radio communication directly or via an intermediate station or by a combination of two or more of these methods.

14. Apparatus according to claim 1 wherein the apparatus comprises a mobile radio communication unit for operation in a vehicle or other changing noise environment.

15. Apparatus according to claim 14 wherein the mobile radio unit is a digitally operated radio unit.

16. Apparatus according to claim 1 wherein the radio unit operates according to TETRA standard operating procedures.

* * * * *